United States Patent
Nishino et al.

(10) Patent No.: US 11,365,276 B2
(45) Date of Patent: Jun. 21, 2022

(54) BLOCK COPOLYMER AND METHOD FOR PRODUCING BLOCK COPOLYMER

(71) Applicant: DENKA COMPANY LIMITED, Tokyo (JP)

(72) Inventors: Wataru Nishino, Itoigawa (JP); Yuhei Ishigaki, Itoigawa (JP); Takashi Aizawa, Itoigawa (JP); Shogo Hagiwara, Itoigawa (JP); Uichiro Yamagishi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 370 days.

(21) Appl. No.: 16/481,752

(22) PCT Filed: Mar. 29, 2018

(86) PCT No.: PCT/JP2018/013412
§ 371 (c)(1),
(2) Date: Jul. 29, 2019

(87) PCT Pub. No.: WO2018/181801
PCT Pub. Date: Oct. 4, 2018

(65) Prior Publication Data
US 2019/0389994 A1 Dec. 26, 2019

(30) Foreign Application Priority Data

Mar. 30, 2017 (JP) .............................. JP2017-067178

(51) Int. Cl.
*C08F 293/00* (2006.01)
*C09J 153/02* (2006.01)

(52) U.S. Cl.
CPC ......... *C08F 293/005* (2013.01); *C09J 153/02* (2013.01); *C08F 2438/03* (2013.01)

(58) Field of Classification Search
CPC ... C08F 212/08; C08F 236/18; C08F 2438/03
See application file for complete search history.

(56) References Cited

U.S. PATENT DOCUMENTS

| 5,089,601 A | 2/1992 | Ozoe et al. |
| 2009/0036608 A1 | 2/2009 | Ozoe |

FOREIGN PATENT DOCUMENTS

| CN | 101263170 A | 9/2008 |
| JP | S53-038189 A | 10/1978 |
| JP | H03-207710 A | 9/1991 |
| JP | H03-212414 A | 9/1991 |
| JP | 2002-348340 A | 12/2002 |
| JP | 2006-143899 A | 6/2006 |
| JP | 2007-039654 A | 2/2007 |
| JP | 2007-297502 A | 11/2007 |
| JP | 2011-122141 A | 6/2011 |
| WO | WO-9801478 A1 * | 1/1998 ........... C07C 327/36 |

OTHER PUBLICATIONS

PCT/ISA/210, "International Search Report for International Application No. PCT/JP2018/013412," dated Jul. 3, 2018.
RSC Advances; Jia Hui et al., "Reversible-deactivation radical polymerization of chloroprene and the synthesis of novel polychloroprene-based block copolymers by the RAFT approach", The royal Society of Chemistry, 2014, vol. 4, Issue 98, pp. 55529-55538.
China Patent Office, "Office Action for Chinese Patent Application No. 201880005937.4," dated Sep. 27, 2021.
Wako Pure Chemical Corporation, Japan, "Wako Organic Aquare," No. 56, 2016, p. 2-10.

* cited by examiner

*Primary Examiner* — Mark S Kaucher
(74) *Attorney, Agent, or Firm* — Manabu Kanesaka

(57) ABSTRACT

To provide a block copolymer that includes an aromatic vinyl compound polymer and a chloroprene polymer, has a number average molecular weight of 100,000 or more, is preferred for a rubber composition and an adhesive composition, and is suitable for industrial production. A block copolymer includes at least one aromatic vinyl compound polymer block and at least one chloroprene polymer block, has a functional group with a structure represented by Chemical Formula (1) or (2), and has a number average molecular weight of 100,000 or more. The chloroprene polymer block has a number average molecular weight of 80,000 or more in total.

[Chemical Formula 1]

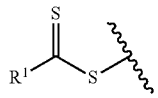

(1)

[Chemical Formula 2]

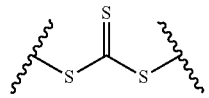

(2)

(In Chemical Formula (1), $R^1$ is hydrogen, chlorine, a substituted or unsubstituted alkyl group, a substituted or unsubstituted alkenyl group, a substituted or unsubstituted aryl group, or a substituted or unsubstituted heterocyclyl group.)

9 Claims, No Drawings

BLOCK COPOLYMER AND METHOD FOR PRODUCING BLOCK COPOLYMER

RELATED APPLICATIONS

The present application is National Phase of International Application No. PCT/JP2018/013412 filed Mar. 29, 2018, and claims a priority from Japanese Application No. 2017-067178, filed Mar. 30, 2017, the disclosures of which are hereby incorporated by reference herein in its entirety.

TECHNICAL FIELD

The present technology relates to a block copolymer and a method for producing a block copolymer. More specifically, the technology relates to a block copolymer comprising at least one aromatic vinyl compound polymer block and at least one chloroprene polymer block and to a method for producing a block copolymer.

BACKGROUND ART

Block copolymers comprising an aromatic vinyl compound polymer block and a chloroprene polymer block have been studied and developed. For example, Patent Document 1 discloses, in Synthesis Example 9, a maleic anhydride/styrene alternating copolymer-CR diblock copolymer having a number average molecular weight of 4,600. Patent Document 1 discloses, in Synthesis Example 11, a maleic anhydride/styrene/methacrylic acid copolymer-CR diblock copolymer having a number average molecular weight of 4,800. Patent Document 2 discloses the technology of giving a styrene/chloroprene polymer by anionic polymerization.

CITATION LIST

Patent Document

Patent Document 1: JP-A No. 2007-297502
Patent Document 2: JP-A No. H03-207710

SUMMARY OF THE INVENTION

Technical Problem

The block copolymer according to Patent Document 1 has a small number average molecular weight and does not have such a sufficient molecular weight as to be usable in industrial applications. For sufficient usability in industrial applications, the number average molecular weight is preferably 100,000 or more.

The technology according to Patent Document 2 requires anionic polymerization using an organic solvent at a low temperature under an anhydrous condition and is unsuitable for industrial production. In addition, the styrene/chloroprene polymer according to Patent Document 2 has no active functional group and thus is inferior in physical characteristics.

Chloroprene polymers are known to be usable in a rubber composition or an adhesive composition. The styrene/chloroprene polymer according to Patent Document 2, however, has no active functional group, thus is difficult to give a rubber composition or an adhesive composition having excellent physical characteristics, and is unsuitable for the material of such a composition.

The present invention, therefore, has a main object to provide a block copolymer that comprises an aromatic vinyl compound polymer and a chloroprene polymer, has a number average molecular weight of 100,000 or more, is preferred for a rubber composition and an adhesive composition, and is suitable for industrial production.

Solution to Problem

The present invention provides a block copolymer comprising at least one aromatic vinyl compound polymer block and at least one chloroprene polymer block, having a functional group with a structure represented by Chemical Formula (1) or (2), and having a number average molecular weight of 100,000 or more, and the chloroprene polymer block has a number average molecular weight of 80,000 or more in total.

[Chemical Formula 1]

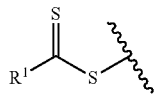

(1)

[Chemical Formula 2]

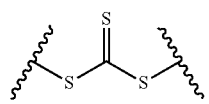

(2)

(In Chemical Formula (1), $R^1$ is hydrogen, chlorine, a substituted or unsubstituted alkyl group, a substituted or unsubstituted alkenyl group, a substituted or unsubstituted aryl group, or a substituted or unsubstituted heterocyclyl group)

The aromatic vinyl compound may be at least one selected from the group consisting of styrene, alkylstyrenes, arylstyrenes, halogenated styrenes, alkoxystyrenes, and vinylbenzoic acid esters.

The present invention also provides a method for producing a block copolymer, and the method comprises subjecting an aromatic vinyl compound alone or an aromatic vinyl compound together with an additional monomer to living radical emulsion polymerization in a presence of a compound represented by Chemical Formula (3) or (4), synthesizing an aromatic vinyl compound polymer block, and then adding chloroprene alone or chloroprene together with an additional monomer to promote living radical emulsion polymerization, synthesizing a chloroprene polymer block. In the method, the block copolymer has a number average molecular weight of 100,000 or more, and the chloroprene polymer block has a number average molecular weight of 80,000 or more in total.

[Chemical Formula 3]

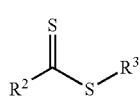

(3)

[Chemical Formula 4]

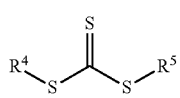

(4)

(In Chemical Formula (3), $R^2$ is hydrogen, chlorine, a substituted or unsubstituted alkyl group, a substituted or unsubstituted alkenyl group, a substituted or unsubstituted aryl group, or a substituted or unsubstituted heterocyclyl group; and in Chemical Formulae (3) and (4), $R^3$ to $R^5$ are each independently a substituted or unsubstituted alkyl group, a substituted or unsubstituted, saturated, unsaturated, or aromatic carbocycle, a substituted or unsubstituted, saturated, unsaturated, or aromatic heterocycle, an organometallic species, or any polymer chain)

The present invention further provides a method for producing a block copolymer, and the method comprises gradually adding chloroprene alone or chloroprene together with an additional monomer in a presence of a compound represented by Chemical Formula (3) or (4) to promote living radical emulsion polymerization, synthesizing a chloroprene polymer block, and then adding an aromatic vinyl compound alone or an aromatic vinyl compound together with an additional monomer to promote living radical emulsion polymerization, synthesizing an aromatic vinyl compound polymer block. In the method, the block copolymer has a number average molecular weight of 100,000 or more, and the chloroprene polymer block has a number average molecular weight of 80,000 or more in total.

The present invention provides a composition comprising the block copolymer.

The composition may be a rubber composition or an adhesive composition.

The present invention provides a base isolation/vibration isolation part, a belt, an adhesive, an automobile part, a motorcycle part, an aircraft part, a ship part, a railway car part, a medical care/nursing care part, or an electronic material comprising the composition.

Advantageous Effects of Invention

The present invention enables the production of a block copolymer that comprises an aromatic vinyl compound polymer and a chloroprene polymer, has a number average molecular weight of 100,000 or more, is preferred for a rubber composition and an adhesive composition, and is suitable for industrial production. In particular, the present invention enables the production of a rubber composition having an excellent mechanical strength and damping performance and an adhesive composition having a low viscosity and an excellent high temperature strength.

DESCRIPTION OF EMBODIMENTS

Embodiments for carrying out the present invention will now be described. The embodiments described below are merely typical embodiments of the present technology and are not intended to limit the scope of the invention.

<1. Block Copolymer>

A block copolymer pertaining to an embodiment of the present invention will be described. The block copolymer comprises at least one aromatic vinyl compound polymer block and at least one chloroprene polymer block.

The aromatic vinyl compound polymer may be a homopolymer of a single aromatic vinyl compound, a copolymer of two or more aromatic vinyl compounds, or a copolymer of an aromatic vinyl compound and an additional monomer. The aromatic vinyl compound is preferably at least one selected from the group consisting of styrene, alkylstyrenes, arylstyrenes, halogenated styrenes, alkoxystyrenes, and vinylbenzoic acid esters and is more preferably styrene. Examples of the additional monomer to form a copolymer together with the aromatic vinyl compound include conjugated dienes such as butadiene and isoprene, acrylic acid and esters thereof, methacrylic acid and esters thereof, acrylonitrile, and methacrylonitrile. The aromatic vinyl compound polymer is preferably a homopolymer of a single aromatic vinyl compound and is more preferably polystyrene.

The chloroprene polymer may be a homopolymer of chloroprene (2-chloro-1,3-butadiene) or a copolymer of chloroprene and an additional monomer. Examples of the additional monomer to form a copolymer together with chloroprene include 2,3-dichloro-1,3-butadiene, 1-chloro-1,3-butadiene, acrylonitrile, methacrylonitrile, butadiene, isoprene, acrylic acid and esters thereof, and methacrylic acid and esters thereof. The chloroprene polymer is preferably a homopolymer of chloroprene (polychloroprene).

The block copolymer has a number average molecular weight (Mn) of 100,000 or more and preferably 120,000 or more for sufficient usability in industrial applications. The number average molecular weight is preferably 250,000 or less and more preferably 220,000 or less. When the number average molecular weight is set at 250,000 or less, the resulting block copolymer is easily processed in a composition. The molecular weight distribution (Mw/Mn) represented by the ratio of the weight average molecular weight (Mw) to the number average molecular weight (Mn) of the block copolymer of the present embodiment is preferably 1.3 or more and more preferably 1.6 or more. The molecular weight distribution is typically 6.0 or less and preferably 3.0 or less. When a block copolymer has a molecular weight distribution within such a range, a rubber composition and an adhesive composition comprising the block copolymer obtains higher physical characteristics.

The chloroprene polymer block contained in the block copolymer has a number average molecular weight of 80,000 or more in total, preferably 90,000 or more, and more preferably 100,000 or more. A rubber composition comprising a block copolymer containing a chloroprene polymer block having a number average molecular weight of less than 80,000 in total may have a poor mechanical strength. An adhesive composition comprising such a block copolymer may have a poor high temperature strength.

In the present specification, the number average molecular weight and the weight average molecular weight are determined by gel permeation chromatography (GPC).

The block copolymer has a functional group with a structure represented by Chemical Formula (1) or (2).

[Chemical Formula 5]

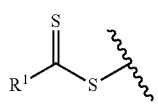
(1)

[Chemical Formula 6]

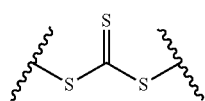
(2)

In Chemical Formula (1), $R^1$ is hydrogen, chlorine, a substituted or unsubstituted alkyl group, a substituted or unsubstituted alkenyl group, a substituted or unsubstituted aryl group, or a substituted or unsubstituted heterocyclyl group.

The functional group as an active functional group serves as a cross-linking point when the block copolymers of the present embodiment are cross-linked together and affects physical characteristics of a composition comprising the block copolymer. Hence, the block copolymer functions to improve the mechanical strength of a rubber composition and to improve the high temperature strength of an adhesive composition.

As described later in detail, the block copolymer having the functional group with the above structure may be prepared by living radical emulsion polymerization reaction in the presence of a compound having a specific structure. It is obvious to a person skilled in the art that a partial structure of a compound used as a chain transfer agent in the living radical emulsion polymerization reaction is introduced as a functional group into a polymer, and this is as described, for example, in a document about typical RAFT polymerization (Aust. J. Chem., 2009, 62, 1402 to 1472). The presence of the functional group in a chloroprene polymer may be identified by any method and typically by $^{13}$C-NMR method (for example, J. Polym. Sci., Part A: Polym. Chem., 2009, 47, 3118 to 3130). $^{13}$C-NMR measurement in a condition of sufficient accumulation numbers enables the observation of peaks derived from the functional group, and this allows the identification of the presence thereof. In addition, a similar measurement of a polymer prepared by living radical emulsion polymerization reaction using a compound represented by Chemical Formula (3) or (4) and enriched with carbon-13 enables a person skilled in the art to identify the presence of the functional group.

The block copolymer includes diblock copolymers each having a structure represented by General Formula (a), (b), (e), or (f). The block copolymer also includes triblock copolymers each having a structure represented by General Formula (c) or (d).

| | |
|---|---|
| A-B—X | (a) |
| B-A-X | (b) |
| A-B-A-X | (c) |
| B-A-B—X | (d) |
| A-B—X—B-A | (e) |
| B-A-X-A-B | (f) |

In General Formulae (a) to (f), A is an aromatic vinyl compound polymer block, B is a chloroprene polymer block, and X is a functional group represented by Chemical Formula (1) or (2).

In the present specification, the number average molecular weight of only the second block moiety in a diblock copolymer is calculated in accordance with the following expression.

(Number average molecular weight of second block)
=(number average molecular weight of first block+second block)−(number average molecular weight of first block)

In a similar manner, the number average molecular weight of only the third block moiety in a triblock copolymer is calculated in accordance with the following expression.

(Number average molecular weight of third block)=
(number average molecular weight of first block+second block+third block)−(number average molecular weight of first block+second block)

Each of the number average molecular weight of the first block, the number average molecular weight of the first block and second block, and the number average molecular weight of the first block, second block, and third block may be determined by GPC analysis of a small amount of a polymer sampled after completion of the polymerization of the first block, the second block, or the third block.

The block copolymer may have at least one of the structures represented by Chemical Formulae (5) to (8).

[Chemical Formula 7]

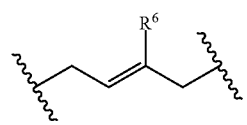

(5)

[Chemical Formula 8]

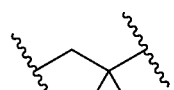

(6)

[Chemical Formula 9]

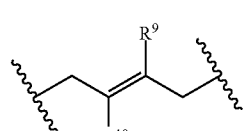

(7)

[Chemical Formula 10]

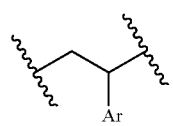

(8)

In Chemical Formulae (5) to (7), $R^6$ to $R^{10}$ are each independently hydrogen, chlorine, a substituted or unsubstituted alkyl group, a substituted or unsubstituted alkenyl group, a substituted or unsubstituted aryl group, or a substituted or unsubstituted heterocyclyl group. In Chemical Formula (8), Ar is an aryl group.

The structures represented by Chemical Formula (5) to (7) may be formed when a chloroprene polymer block is synthesized. The structure represented by Chemical Formula (8) may be formed when an aromatic vinyl compound polymer block is synthesized.

<2. Method for Producing Block Copolymer>

A method for producing a block copolymer pertaining to an embodiment of the present invention will next be described. The above-described block copolymer is produced by the production method.

The production method of the present embodiment is roughly classified into a method in which an aromatic vinyl compound polymer block is first synthesized and then a chloroprene polymer block is synthesized (production method I) and a method in which a chloroprene polymer block is first synthesized and then an aromatic vinyl compound polymer block is synthesized (production method II). Each method will be described in detail.

<2-1. Production Method I>

In the production method I, an aromatic vinyl compound alone or an aromatic vinyl compound together with an additional monomer is subjected to living radical emulsion polymerization in the presence of a compound represented by Chemical Formula (3) or (4), synthesizing an aromatic vinyl compound polymer block (polymerization of the first block), and then chloroprene alone or chloroprene together with an additional monomer is added to promote living radical emulsion polymerization, synthesizing a chloroprene polymer block (polymerization of the second block).

[Chemical Formula 11]

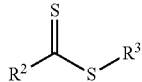

(3)

[Chemical Formula 12]

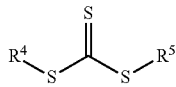

(4)

In Chemical Formula (3), $R^2$ is hydrogen, chlorine, a substituted or unsubstituted alkyl group, a substituted or unsubstituted alkenyl group, a substituted or unsubstituted aryl group, or a substituted or unsubstituted heterocyclyl group. Typically, $R^2$ is a substituent to be introduced into a polymer chain as $R^1$ in General Formula (1). In Chemical Formulae (3) and (4), $R^3$ to $R^5$ are each independently a substituted or unsubstituted alkyl group, a substituted or unsubstituted, saturated, unsaturated, or aromatic carbocycle, a substituted or unsubstituted, saturated, unsaturated, or aromatic heterocycle, an organometallic species, or any polymer chain.

The compound represented by Chemical Formula (3) or (4) functions as a chain transfer agent in the living radical emulsion polymerization. A residue of the compound is left in a resulting block copolymer as a functional group. Hence, the block copolymer produced by the present production method has a functional group having the structure represented by Chemical Formula (1) or (2).

The compound represented by Chemical Formula (3) is not limited to particular compounds, and a common compound may be used. Examples include dithiocarbamates and dithioesters. Specific examples include benzyl 1-pyrrolecarbodithioate (common name: benzyl 1-pyrroledithiocarbamate), benzyl phenylcarbodithioate, 1-benzyl-N,N-dimethyl-4-aminodithiobenzoate, 1-benzyl-4-methoxy dithiobenzoate, 1-phenylethyl imidazolecarbodithioate (common name: 1-phenylethyl imidazoledithiocarbamate), benzyl-1-(2-pyrrolidinone)carbodithioate (common name: benzyl-1-(2-pyrrolidinone)dithiocarbamate), benzyl phthalimidylcarbodithioate, (common name: benzyl phthalimidyldithiocarbamate), 2-cyanopropan-2-yl-1-pyrrolecarbodithioate, (common name: 2-cyanopropan-2-yl-1-pyrroledithiocarbamate), 2-cyanobutan-2-yl-1-pyrrolecarbodithioate, (common name: 2-cyanobutan-2-yl-1-pyrroledithiocarbamate), benzyl-1-imidazolecarbodithioate, (common name: benzyl-1-imidazoledithiocarbamate), 2-cyanopropan-2-yl-N,N-dimethyldithiocarbamate, benzyl-N,N-diethyldithiocarbamate, cyanomethyl-1-(2-pyrrolidone) dithiocarbamate, 2-(ethoxycarbonylbenzyl)propan-2-yl-N, N-diethyldithiocarbamate, 1-phenylethyl dithiobenzoate, 2-phenylpropan-2-yl dithiobenzoate, 1-acet-1-yl-ethyl dithiobenzoate, 1-(4-methoxyphenyl)ethyl dithiobenzoate, benzyl dithioacetate, ethoxycarbonylmethyl dithioacetate, 2-(ethoxycarbonyl)propan-2-yl dithiobenzoate, 2-cyanopropan-2-yl dithiobenzoate, tert-butyl dithiobenzoate, 2,4,4-trimethylpentan-2-yl dithiobenzoate, 2-(4-chlorophenyl)-propan-2-yl dithiobenzoate, 3-vinylbenzyl dithiobenzoate, 4-vinylbenzyl dithiobenzoate, benzyldiethoxyphosphinyl dithioformate, tert-butyl trithioperbenzoate, 2-phenylpropan-2-yl-4-chlorodithiobenzoate, naphthalene-1-carboxylic acid-1-methyl-1-phenyl-ethyl ester, 4-cyano-4-methyl-4-thiobenzylsulfanyl butyric acid, dibenzyl tetrathioterephthalate, carboxymethyl dithiobenzoate, poly(ethylene oxide) having a dithiobenzoate end group, poly(ethylene oxide) having a 4-cyano-4-methyl-4-thiobenzylsulfanyl butyrate end group, 2-[(2-phenylethanethioyl)sulfanyl] propanoate, 2-[(2-phenylethanethioyl)sulfanyl] succinate, potassium 3,5-dimethyl-1H-pyrazole-1-carbodithioate, cyanomethyl-3,5-dimethyl-1H-pyrazole-1-carbodithioate, cyanomethyl methyl-(phenyl)dithiocarbamate, benzyl-4-chlorodithiobenzoate, phenyl methyl-4-chlorodithiobenzoate, 4-nitrobenzyl-4-chlorodithiobenzoate, phenyl propan-2-yl-4-chlorodithiobenzoate, 1-cyano-1-methylethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1H-pyrrole-1-dithiocarboxylic acid, 2-cyanobutane-2-yl 4-chloro-3,5-dimethyl-1H-pyrazole-1-carbodithioate, and cyanomethyl methyl(phenyl)carbamodithioate. Of them, benzyl 1-pyrrolecarbodithioate and benzyl phenylcarbodithioate are particularly preferably used.

The compound represented by Chemical Formula (4) is not limited to particular compounds, and a common compound may be used. Examples include trithiocarbonates such as 2-cyano-2-propyl dodecyl trithiocarbonate, dibenzyl trithiocarbonate, butyl benzyl trithiocarbonate, 2-[[(butylthio)thioxomethyl]thio] propionate, 2-[[(dodecylthio)thioxomethyl]thio] propionate, 2-[[(butylthio)thioxomethyl]thio] succinate, 2-[[(dodecylthio)thioxomethyl]thio] succinate, 2-[[(dodecylthio)thioxomethyl]thio]-2-methyl propionate, 2,2'-[carbonothioyl bis(thio)]bis[2-methylpropionate], 2-amino-1-methyl-2-oxoethyl butyl trithiocarbonate, benzyl 2-[(2-hydroxyethyl)amino]-1-methyl-2-oxoethyl trithiocarbonate, 3-[[[(tert-butyl)thio]thioxomethyl]thio] propionate, cyanomethyl dodecyl trithiocarbonate, diethyl aminobenzyl trithiocarbonate, and dibutyl aminobenzyl trithiocarbonate. Of them, dibenzyl trithiocarbonate and butyl benzyl trithiocarbonate are particularly preferably used.

The amount of the compound represented by Chemical Formula (3) or (4) is preferably 2 mol or less relative to 100 mol of the total monomers consumed in the polymerization in order to give a block copolymer intended in the present embodiment.

To synthesize the aromatic vinyl compound polymer block in the above production method, an aromatic vinyl compound is singly used, or an aromatic vinyl compound and an additional monomer are used. The aromatic vinyl compound may be a single type or two or more types of aromatic vinyl compounds. The aromatic vinyl compound is preferably at least one selected from the group consisting of styrene, alkylstyrenes, arylstyrenes, halogenated styrenes, alkoxystyrenes, and vinylbenzoic acid esters, and is more preferably styrene. The additional monomer may be any monomer copolymerizable with the aromatic vinyl compound, and examples include conjugated dienes such as butadiene and isoprene, acrylic acid and esters thereof, methacrylic acid and esters thereof, acrylonitrile, and methacrylonitrile. Of them, a single type of aromatic vinyl compound is preferably used, and styrene alone is more preferably used.

In the production method, it is preferable that the aromatic vinyl compound, an optional additional monomer, and the compound represented by Chemical Formula (3) or (4) be emulsified in water with an emulsifier/dispersant, and then a radical polymerization initiator be added to promote polymerization reaction in micelles of the emulsifier/dispersant.

Examples of the radical polymerization initiator include organic peroxides such as benzoyl peroxide and isobutyryl peroxide and azo compounds such as azobisisobutyronitrile and 4-methoxy-azobisvaleronitrile. These initiators may be used singly or in combination of two or more of them. The amount of the radical polymerization initiator may be, for example, 0.001 to 5 parts by mass relative to 100 parts by mass of an aromatic vinyl compound monomer.

The emulsifier/dispersant used in the emulsion polymerization is not limited to particular agents and is preferably an anionic or nonionic emulsifier/dispersant from the viewpoint of emulsion stability. An alkali metal salt of rosin acid is particularly preferably used because the block copolymer in a film form at the time of freeze-solidification-drying after the completion of polymerization is allowed to have an appropriate strength to prevent excess contraction or breakage. The rosin acid is a mixture of resin acids, fatty acids, and the like. The resin acid includes abietic acid, neoabietic acid, palustric acid, pimaric acid, isopimaric acid, dehydroabietic acid, dihydropimaric acid, dihydroisopimaric acid, secodehydroabietic acid, and dihydroabietic acid, and the fatty acid includes oleic acid and linoleic acid. Such a component formulation varies with collection methods of rosins classified into gum rosin, wood rosin, and tall oil rosin, growing areas and species of pine trees, distillation/purification methods, and disproportionation reactions and is not limited in the present invention. In consideration of emulsion stability or handleability, a sodium salt or a potassium salt is preferably used. The concentration of the emulsifier/dispersant is preferably 0.1 to 10% by mass and more preferably 1 to 5% by mass. A concentration of 0.1% by mass or more enables sufficient emulsification of monomers, and a concentration of 10% by mass or less facilitates precipitation of the block copolymer for solidification.

The polymerization temperature when the aromatic vinyl compound polymer block is synthesized may be appropriately set depending on a type of the monomer or the like and is preferably 10 to 100° C. and more preferably 70 to 100° C.

The polymerization degree when the aromatic vinyl compound polymer block is synthesized is not specifically limited and is preferably 80% or more and more preferably 90% or more in terms of removal efficiency of an unreacted monomer.

After synthesis of the aromatic vinyl compound polymer block, chloroprene alone or chloroprene together with an additional monomer is added to promote living radical emulsion polymerization, synthesizing a chloroprene polymer block (polymerization of the second block). The additional monomer may be any monomer copolymerizable chloroprene, and examples include 2,3-dichloro-1,3-butadiene, 1-chloro-1,3-butadiene, acrylonitrile, methacrylonitrile, butadiene, isoprene, acrylic acid and esters thereof, and methacrylic acid and esters thereof. Of them, chloroprene alone is preferably used.

The chloroprene polymer block may be synthesized by subsequently subjecting a latex containing the aromatic vinyl compound polymer block to seed polymerization without separation of the aromatic vinyl compound polymer block, but the synthesis is not limited to this process. The latex containing the aromatic vinyl compound polymer may contain an unreacted monomer. After temporal separation of the aromatic vinyl compound polymer block from the polymerization system, the aromatic vinyl compound polymer block and a monomer such as chloroprene may be dissolved in a solvent, and the chloroprene polymer block may be synthesized.

Chloroprene and an optional additional monomer may be added at once or gradually added, and are preferably added at once into a polymerization system. When the monomers are gradually added, the chloroprene monomer is insufficient relative to an active end of the aromatic vinyl compound polymer block in micelles, and this may cause a side reaction. In contrast, when the monomers are added at once, the chloroprene monomer is present in a relatively large amount, and this improves control polymerizability.

The polymerization temperature when the chloroprene polymer block is synthesized is preferably 10 to 50° C. in order to ensure the stability of the chloroprene polymer block. A polymerization temperature of 10° C. or more allows the emulsion to have a higher viscosity or the initiator to function more efficiency. Chloroprene has a boiling point of about 59° C., and hence at a polymerization temperature of 50° C. or less, even when abnormal polymerization or the like generates heat, the heat is sufficiently removed to prevent a reaction solution from bumping. As for living properties, hydrolysis of a chain transfer agent or monomer evaporation is disregarded at 50° C. or less, and thus such a condition is preferred.

The polymerization degree of the chloroprene polymer block is preferably 80% or less in order to suppress gelation of the block copolymer. The polymerization degree may be controlled by addition of a polymerization inhibitor to stop the polymerization. The polymerization inhibitor is not specifically limited, and examples include oil-soluble polymerization inhibitors such as thiodiphenylamine, 4-tert-butylcatechol, and 2,2-methylenebis-4-methyl-6-tert-butylphenol, and water-soluble polymerization inhibitors such as diethylhydroxylamine.

An unreacted monomer may be removed by a known method such as heating under vacuum. The pH is next adjusted, then freeze-solidification, water washing, hot-air drying, and other processes are performed, and a block copolymer in a solid form may be collected.

The resulting block copolymer has a number average molecular weight of 100,000 or more, and the chloroprene polymer block has a number average molecular weight of 80,000 or more in total. The number average molecular weight may be controlled by appropriately adjusting the ratio of a monomer to a radical polymerization initiator or the polymerization degree.

The resulting block copolymer has the structure represented by General Formula (a), "A-B—X", or General Formula (e), "A-B—X—B-A", of the structures represented by General Formulae (a) to (f).

After synthesis of a chloroprene polymer block by the production method followed by removal of an unreacted monomer, an aromatic vinyl compound alone or an aromatic vinyl compound together with an additional monomer may be added to promote living radical emulsion polymerization, further synthesizing an aromatic vinyl compound polymer block (polymerization of the third block). This process enables the production of a block copolymer having the structure represented by General Formula (c), "A-B-A-X".

To further synthesize an aromatic vinyl compound polymer block, the polymerization degree is preferably 80% or less in order to suppress gelation of the block copolymer. Other reaction conditions and treatments are the same as above.

<2-2. Production Method II>

In production method II, in the presence of a compound represented by Chemical Formula (3) or (4), chloroprene alone or chloroprene together with an additional monomer is gradually added to promote living radical emulsion polymerization, synthesizing a chloroprene polymer block (polymerization of the first block), and then an aromatic vinyl compound alone or an aromatic vinyl compound together with an additional monomer is added to promote living radical emulsion polymerization, synthesizing an aromatic vinyl compound polymer block (polymerization of the second block).

In the description for production method II, different points from production method I will be described, and the same points as in production method I will not be described.

In the production method, to synthesize a chloroprene polymer block, a part of chloroprene or of chloroprene together with an additional monomer is mixed with a chain transfer agent at the initial step, and the remaining chloroprene or the remaining chloroprene together with the additional monomer is then added. If a chloroprene monomer and a chain transfer agent are added at once to promote polymerization, control polymerizability may deteriorate.

In the production method, of chloroprene and an optional additional monomer, preferably 1 to 50% by mass, more preferably 5 to 50% by mass, most preferably 20 to 40% by mass of the monomers are preferably emulsified together with the compound represented by Chemical Formula (3) or (4) in water with an emulsifier/dispersant. The remaining chloroprene and the optional additional monomer are then added to promote living radical emulsion polymerization, synthesizing a chloroprene polymer block.

The polymerization degree of the chloroprene polymer block is preferably 80% or less in order to suppress gelation of the block copolymer. The polymerization degree may be controlled by addition of a polymerization inhibitor to stop the polymerization. The polymerization inhibitor is not specifically limited, and examples include oil-soluble polymerization inhibitors such as thiodiphenylamine, 4-tert-butylcatechol, and 2,2-methylenebis-4-methyl-6-tert-butylphenol, and water-soluble polymerization inhibitors such as diethylhydroxylamine.

After synthesis of the chloroprene polymer block, an unreacted monomer is preferably removed. An aromatic vinyl compound alone or an aromatic vinyl compound together with an additional monomer is then added to promote living radical emulsion polymerization, synthesizing an aromatic vinyl compound polymer block. The aromatic vinyl compound and a monomer copolymerizable with the aromatic vinyl compound may be added at once.

The resulting block copolymer has the structure represented by General Formula (b), "B-A-X", or General Formula (f), "B-A-X-A-B", of the structures represented by General Formulae (a) to (f).

After synthesis of the aromatic vinyl compound polymer block by the production method followed by removal of an unreacted monomer, chloroprene alone or chloroprene together with an additional monomer may be added to promote living radical emulsion polymerization, further synthesizing a chloroprene polymer block (polymerization of the third block). This process enables the production of a block copolymer having the structure represented by General Formula (d), "B-A-B—X".

The polymerization degree when the aromatic vinyl compound polymer block is synthesized is not specifically limited and is preferably 80% or more and more preferably 90% or more in terms of removal efficiency of an unreacted monomer.

To further synthesize a chloroprene polymer block, chloroprene and an optional additional monomer are preferably added at once. This enables polymerization reaction in a condition in which a chloroprene monomer is present in a sufficient amount relative to an aromatic vinyl compound polymer block, and the chloroprene polymer block is smoothly synthesized.

As described above, in the production method of the present embodiment, a block copolymer comprising an aromatic vinyl compound polymer block and a chloroprene polymer block is produced by living radical emulsion polymerization. Although a technique of using anionic polymerization to give a styrene/chloroprene polymer has been known (Patent Document 2), the anionic polymerization is required to be performed at a low temperature of −70 to 0° C. and in an anhydrous condition using an organic solvent, and thus the technique is unsuitable for industrial production. In contrast, the production method of the present embodiment enables the production of a block copolymer without anionic polymerization and thus is preferred for industrial production.

The polymerization degree of the chloroprene polymer block is preferably 80% or less in order to suppress gelation of the block copolymer. The polymerization degree may be controlled by addition of a polymerization inhibitor to stop the polymerization. The polymerization inhibitor is not specifically limited, and examples include oil-soluble polymerization inhibitors such as thiodiphenylamine, 4-tert-butylcatechol, and 2,2-methylenebis-4-methyl-6-tert-butylphenol, and water-soluble polymerization inhibitors such as diethylhydroxylamine.

<3. Composition>

A composition pertaining to an embodiment of the present invention comprises the above block copolymer and is preferably a rubber composition or an adhesive composition. The rubber composition comprising the above block copolymer has an excellent mechanical strength and damping performance. The adhesive composition comprising the above block copolymer has a low viscosity and an excellent high temperature strength.

In the composition of the present embodiment, materials other than the block copolymer are not specifically limited and may be appropriately selected depending on purposes or applications. Examples of the material to be contained in the rubber composition include a vulcanizing agent, a vulcanization accelerator, a filler or reinforcement, a plasticizer, a process aid or lubricant, an age inhibitor, and a silane coupling agent.

As the usable vulcanizing agent, sulfur and thiourea, guanidine, thiuram, and thiazole organic vulcanizing agents, which are typically used for vulcanization of a chloroprene rubber, may be used, and a thiourea vulcanizing agent is preferred. Examples of the thiourea vulcanizing agent include ethylenethiourea, diethylthiourea, trimethylthiourea, triethylthiourea, and N,N'-diphenylthiourea, and trimethylthiourea and ethylene thiourea are particularly preferred. In addition, 3-methylthiazolidinethione-2-dimethylammonium hydrogen isophthalate, a 1,2-dimercapto-1,3,4-thiadiazole derivative, and a similar vulcanizing agent may be used. These vulcanizing agents exemplified above may be used in combination of two or more of them. Elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, an oxide of such a metal, and a hydroxide of such a metal may be used as the vulcanizing agent. Of these usable vulcanizing agents, calcium oxide, zinc oxide, antimony dioxide, antimony trioxide, and magnesium oxide have high vulcanization effect and thus are particularly preferred. These vulcanizing agents may be used in combination of two or more of them. The vulcanizing agent is preferably added in a range of 0.1 part by mass or more and 10 parts by mass or less in total relative to 100 parts by mass of the rubber component in the rubber composition of the present embodiment.

The filler or reinforcement is added in order to adjust the hardness of rubber or to improve the mechanical strength thereof and is not specifically limited. Examples include carbon black, silica, clay, talc, and calcium carbonate. Other examples of the usable inorganic filler include, but are not necessarily limited to, alumina ($Al_2O_3$) such as γ-alumina and α-alumina, alumina monohydrate ($Al_2O_3$—$H_2O$) such as boehmite and diaspore, aluminum hydroxide [$Al(OH)_3$] such as gibbsite and bayerite, aluminum carbonate [$Al_2(CO_3)_2$], magnesium hydroxide [$Mg(OH)_2$], magnesium carbonate ($MgCO_3$), talc ($3MgO.4SiO_2.H_2O$), attapulgite ($5MgO.8SiO_2.9H_2O$), titanium white ($TiO_2$), titanium black ($TiO_2$), calcium oxide (CaO), calcium hydroxide [$Ca(OH)_2$], magnesium aluminum oxide ($MgO.Al_2O_3$), clay ($Al_2O_3.2SiO_2$), kaolin ($Al_2O_3.2SiO_2.2H_2O$), pyrophyllite ($Al_2O_3.4SiO_2$—$H_2O$), bentonite ($Al_2O_3.4SiO_2.2H_2O$), aluminum silicate ($Al_2SiO_5$, $Al_4.3SiO_4.5H_2O$, and the like), magnesium silicate ($Mg_2SiO_4$, $MgSiO_3$, and the like), calcium silicate ($Ca_2SiO_4$ and the like), aluminum calcium silicate ($Al_2O_3.CaO.2SiO_2$ and the like), calcium magnesium silicate ($CaMgSiO_4$, calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicate containing hydrogens and alkali metals or alkaline earth metals for correcting charges, such as various zeolites. The fillers and reinforcements may be used singly or in combination of two or more of them. The amount of the filler and reinforcement may be adjusted depending on physical properties of an intended rubber composition of the present embodiment or a vulcanized product thereof and is not specifically limited. Typically, the filler and reinforcement may be added in an amount of 15 parts by mass or more and 200 parts by mass or less in total relative to 100 parts by mass of the rubber component in the rubber composition of the embodiment.

The plasticizer may be any plasticizer compatible with rubber, and examples include plant oils such as rapeseed oil, linseed oil, castor oil, and coconut oil, phthalate plasticizers, DUP (diundecyl phthalate), DOS (dioctyl sebacate), DOA (dioctyl adipate), ester plasticizers, ether ester plasticizers, thioether plasticizers, and petroleum plasticizers such as aroma oil, naphthene oil, lubricating oil, process oil, paraffin, liquid paraffin, vaseline, and petroleum asphalt. These plasticizers may be used singly or in combination of two or more of them depending on intended characteristics for the rubber composition of the embodiment or a vulcanized product of the composition. The amount of the plasticizer is not specifically limited, and the plasticizer is typically used in an amount of 5 parts by mass or more and 50 parts by mass or less in total relative to 100 parts by mass of the rubber component in the rubber composition of the embodiment.

The process aid or lubricant is added in order to improve processing characteristics or surface lubricity, for example, to help release from a roller, a mold, an extruder screw, or the like when a rubber composition is kneaded or vulcanization molded, and examples include fatty acids such as stearic acid, paraffin process aids such as polyethylene, and fatty acid amides. The process aids and lubricants may be used singly or in combination of two or more of them. The amount thereof is not specifically limited and is typically 0.5 part by mass or more and 5 parts by mass or less in total relative to 100 parts by mass of the rubber component in the rubber composition of the embodiment.

As the age inhibitor for improving heat resistance, a primary age inhibitor used for typical rubber applications and for capturing radicals to prevent autoxidation and a secondary age inhibitor for detoxifying hydroperoxide may be added. Each age inhibitor may be added in an amount of 0.1 part by mass or more and 10 parts by mass or less and preferably 2 parts by mass or more and 5 parts by mass or less relative to 100 parts by mass of the rubber component in the rubber composition. These age inhibitors may be used singly or in combination of two or more of them. Examples of the primary age inhibitor include phenol age inhibitors, amine age inhibitors, acrylate age inhibitors, imidazole age inhibitors, metal carbamates, and wax, and examples of the secondary age inhibitor include phosphoric age inhibitors, sulfuric age inhibitors, and imidazole age inhibitors. Examples of the age inhibitor include, but are not necessarily limited to, N-phenyl-1-naphthylamine, alkylated diphenylamines, octylated diphenylamine, 4,4'-bis(α,α-dimethylbenzyl)diphenylamine, p-(p-toluenesulfonylamide) diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 1,1,3-tris-(2-methyl-4-hydroxy-5-tert-butylphenyl)butane, 4,4'-butylidenebis-(3-methyl-6-tert-butylphenol), 2,2-thiobis(4-methyl-6-tert-butylphenol), 7-octadecyl-3-(4'-hydroxy-3',5'-di-tert-butylphenyl) propionate, tetrakis-[methylene-3-(3',5'-di-tert-butyl-4'-hydroxyphenyl) propionate]methane, pentaerythritol-tetrakis[3-(3,5-di-tert-butyl-4-hydroxyphenyl) propionate], triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], 2,4-bis (n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylenebis[3-(3,5-di-tert-butyl-4-hydroxyphenyl) propionate], N,N'-hexamethylenebis(3,5-di-tert-butyl-4-hydroxy)-hydrocinnamide, 2,4-bis [(octylthio)methyl]-o-cresol, 3,5-di-tert-butyl-4-hydroxybenzyl-phosphonate-diethyl ester, tetrakis [methylene(3,5-di-tert-butyl-4-hydroxy hydrocinnamate)] methane, octadecyl-3-(3,5-di-tert-butyl-4-hydroxyphenyl) propionic acid ester and 3,9-bis[2-{3-(3-tert-butyl-4-hydroxy-5-methylphenyl)propionyloxy}-1,1-dimethylethyl]-2,4,8,10-tetraoxaspiro[5.5]undecane, tris(nonyl/phenyl) phosphite, tris(mixed mono- and di-nonylphenyl) phosphite, diphenyl mono(2-ethylhexyl) phosphite, diphenyl monotridecyl phosphite, diphenyl isodecyl phosphite, diphenyl isooctyl phosphite, diphenyl nonylphenyl phosphite, triphenyl phosphite, tris(tridecyl) phosphite, triisodecyl phosphite, tris(2-ethylhexyl) phosphite, tris(2,4-di-tert-butylphenyl) phosphite, tetraphenyl dipropylene glycol diphosphite, tetraphenyl tetra(tridecyl) pentaerythritol tetraphosphite, 1,1,3-tris(2-methyl-4-di-tridecyl phosphite-5-tert-butylphenyl)butane, 4,4'-butylidenebis(3-methyl-6-tert-butyl-di-tridecyl phosphite), 2,2'-ethylidenebis(4,6-di-tert-butylphenol) fluoro phosphite, 4,4'-isopropylidene-diphenol alkyl (C12 to C15) phosphite, cyclic neopentane tetraylbis(2,4-di-tert-butylphenyl phosphite), cyclic neopentane tetraylbis(2,6-di-tert-butyl-4-phenyl phosphite), cyclic neopentane tetraylbis (nonylphenyl phosphite), bis(nonylphenyl) pentaerythritol diphosphite, dibutyl hydrogen phosphite, distearyl pentaerythritol diphosphite, and hydrogenated bisphenol A pentaerythritol phosphite polymer.

In order to improve the adhesiveness between the above block copolymer or a rubber component such as natural rubber and a filler or reinforcement and to increase the mechanical strength, a silane coupling agent may be further added. The silane coupling agent may be added when the rubber composition is kneaded or may be added as previous surface treatment of a filler or reinforcement. The silane coupling agents may be used singly or in combination of two or more of them. Examples include, but are not necessarily limited to, bis-(3-triethoxysilylpropyl) tetrasulfide, bis-(3-trimethoxysilylpropyl) tetrasulfide, bis-(3-methyldimethoxysilylpropyl) tetrasulfide, bis-(2-triethoxysilylethyl) tetrasulfide, bis-(3-triethoxysilylpropyl) disulfide, bis-(3-trimethoxysilylpropyl) disulfide, bis-(3-triethoxysilylpropyl) trisulfide, 3-hexanoylthiopropyltriethoxysilane, 3-octanoylthiopropyl-triethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-aminopropyltrimethoxysilane, 3-aminopropyltriethoxysilane, γ-glycidoxypropyltrimethoxysilane, γ-glycidoxypropylmethyldiethoxysilane, 3-trimethoxysilylpropyl-N,N-dimethylthiocarbamoyl tetrasulfide, 3-trimethoxysilylpropylbenzothiazolyl tetrasulfide, 3-trimethoxysilylpropylmethacryloyl monosulfide, methyltrimethoxysilane, methyltriethoxysilane, dimethyldiethoxysilane, dimethyldimethoxysilane, trimethylethoxysilane, trimethylmethoxysilane, isobutyltrimethoxysilane, n-decyltrimethoxysilane, phenyltrimethoxysilane, phenyltriethoxysilane, diphenyldimethoxysilane, diphenyldiethoxysilane, hexyltrimethoxysilane, octadecylmethyldimethoxysilane, octadecyltrimethoxysilane, methyltrichlorosilane, dimethyldichlorosilane, triphenylchlorosilane, heptadecafluorodecylmethyldichlorosilane, heptadecafluorodecyltrichlorosilane, and triethylchlorosilane.

The adhesive composition of the present embodiment is preferably a solvent type adhesive composition. Examples of the material to be contained in the solvent type adhesive composition include a solvent, a metal oxide, a tackifier resin, an age inhibitor, a formaldehyde catcher, a filler, an ultraviolet absorber such as benzotriazole, and a light stabilizer such as hindered amines.

The solvent is not aromatic solvents such as toluene, xylene, and ethylbenzene, which may cause sick house syndrome, but is a non-aromatic solvent such as n-hexane, cyclohexane, methylcyclohexane, acetone, methyl ethyl ketone, ethyl acetate, and butyl acetate. The block copolymer is hardly dissolved in each solvent but is preferably dissolved by using only a mixture of such poor solvents. The amount of the solvent may be appropriately set depending on an application or type of the adhesive and is not specifically limited. When the solvent is used such that the solid concentration of the block copolymer is 10 to 30% by mass, the resulting adhesive has a satisfactory balance between high temperature adhesive strength and initial adhesive strength, and such a condition is preferred.

As the metal oxide, for example, zinc oxide (zinc flower), aluminum oxide, titanium oxide, or magnesium oxide may be used.

As the tackifier resin, for example, a phenol resin, a rosin resin, a coumarone resin, or a petroleum resin may be used.

As the age inhibitor, for example, 2,2'-methylenebis(4-ethyl-6-t-butylphenol), 2,2'-methylenebis(4-methyl-6-t-butylphenol), 2,6-di-t-butyl-4-methylphenol, pentaerythritol tetrakis [3-(3,5-di-t-butyl-4-hydroxyphenyl) propionate], thiodiethylene bis[3-(3,5-di-t-butyl-4-hydroxyphenyl) propionate], octadecyl-3-(3,5-di-t-butyl-4-hydroxyphenyl) propionate, N,N'-hexane-1,6-diylbis-3-(3,5-di-t-butyl-4-hydroxyphenylpropionamide), 3,5-bis(1,1-dimethylethyl)-4-hydroxy alkyl ester, diethyl[{3,5-bis(1,1-dimethylethyl)-4-hydroxyphenyl}methyl] phosphonate, 3,3',3'',5,5',5''-hexa-t-butyl-a,a',a''-(mesitylene-2,4,6-tolyl)tri-p-cresol, ethylenebis(oxyethylene)bis[3-(5-t-butyl-4-hydroxy-m-tolyl) propionate], tetraethylthiuram disulfide, tetrabutylthiuram disulfide, or tetramethylthiuram monosulfide may be used.

As the formaldehyde catcher, for example, pyrrolidine, piperidine, piperazine, morpholine, melamine, dicyandiamide, urea, ethylene urea, 4,5-dimethoxyethylene urea, propylene urea, 5-methylpropylene urea, 5-hydroxypropylene urea, 5-methoxypropylene urea, oxalyl urea (parabanic acid), hydrazobenzothiazole, semicarbazide, or thiosemicarbazide may be used, and this enables capture of formaldehyde that is a harmful volatile substance.

As the filler, talc, calcium carbonate, clay, smectite, silica, hydrotalcite, mica, or the like may be used.

The rubber composition and the adhesive composition may be produced using a known machine or apparatus by a common method.

The method for producing a product comprising the above composition may be any method in which the composition is mixed. The composition may be used without treatment or may be used after vulcanization.

<4. Product Comprising Composition>

A product pertaining to an embodiment of the present invention comprises the above composition. The product of the present embodiment is preferably a base isolation/vibration isolation part, a belt, an adhesive, an automobile part, a motorcycle part, an aircraft part, a ship part, a railway car part, a medical care/nursing care part, or an electronic material. Of these products, the adhesive comprises the above adhesive composition, and the other products comprise the above rubber composition. The products comprising the rubber composition have an excellent mechanical strength and damping performance. The adhesive comprising the adhesive composition has a low viscosity and an excellent high temperature strength.

EXAMPLES

The present invention will next be described in further detail with reference to examples. The examples described below are merely typical examples of the present invention, and the present invention is not limited to the following examples.

The molecular weights and the polymerization degrees (also called polymerization conversion rate) mentioned in the following examples were determined by the following procedures.

<Measurement of Molecular Weight>

The number average molecular weight Mn, the weight average molecular weight Mw, and the molecular weight distribution (Mw/Mn) of a resulting chloroprene/styrene diblock copolymer or a polymer or copolymer sampled during preparation were determined as follows: a sample of such a copolymer or polymer was adjusted to have a concentration of 0.1% by mass with THF and was subjected to measurement with a TOSOH HLC-8320GPC (in terms of standard polystyrene). In the measurement, TSK guard column HHR-H was used as a precolumn, and three columns of HSKgel GMHHR-H were used as analytical columns. In the measurement, a sample was eluted at a sample pump pressure of 8.0 to 9.5 MPa and a flow rate of 1 mL/min, at 40° C. A differential refractometer was used for detection. As for the calibration curve indicating the relation between elution time and molecular weight, nine standard polystyrene samples having the following molecular weights were measured to prepare a calibration curve. (Mw=$8.42 \times 10^6$, $1.09 \times 10^6$, $7.06 \times 10^5$, $4.27 \times 10^5$, $1.90 \times 10^5$, $9.64 \times 10^4$, $3.79 \times 10^4$, $1.74 \times 10^4$, $2.63 \times 10^3$). On the basis of the calibration curve and the elution time of a sample, the molecular weight of the copolymer or polymer in each sample was determined.

<Polymerization Degree>

The polymerization degree from the start of polymerization to a certain time was calculated from the dry weight of a sampled latex (emulsion polymerization liquid) after air-drying by heat. Specifically, calculation was performed in accordance with General Formula (XII). The dry weight during polymerization was determined by adding, to a latex, such a small amount of a polymerization inhibitor as not to affect the dry weight and using General Formula (XII).

Polymerization degree [%]={(total charge amount [g]×solid concentration [% by mass]/100)−(residual amount after evaporation [g])}/monomer charge amount [g]×100     (XII)

In the formula, the solid concentration is calculated as follows: 2 g of a sampled latex is heated at 130° C. to remove a solvent (water), volatile chemical agents, and materials; and a volatile content determined from the change in mass before and after the heating is subtracted to give the solid concentration (% by mass). The total charge amount and the residual amount after evaporation were calculated from a polymerization formulation. The total charge amount is the total amount of materials, reagents, and a solvent (water) charged in a polymerization tank from the start of polymerization to a certain time. The residual amount after evaporation is the mass of chemical agents and materials that have not volatilized in a condition at 130° C. but have left together with a polymer as solid and are the chemical agents and the materials charged from the start of polymerization to a certain time. The monomer charge amount is the total amount of monomers charged in a polymerization tank at the initial step and monomers gradually added from the start of polymerization to a certain time.

The polymerization degree of each block of a copolymer was similarly calculated from the dry weight of a sampled latex (emulsion polymerization liquid) after air-drying by heat. Specifically, calculation was performed in accordance with General Formula (XII). The dry weight during polymerization was determined by adding, to a latex, such a small amount of a polymerization inhibitor as not to affect the dry weight and using General Formula (XII). In the formula, the solid concentration is calculated as follows: 2 g of a sampled latex is heated at 130° C. to remove a solvent (water), volatile chemical agents, and materials; and a volatile content determined from the change in mass before and after the heating is subtracted to give the solid concentration (% by mass). The total charge amount and the residual amount after evaporation were calculated from a polymerization formulation. The total charge amount is the total amount of materials, reagents, and a solvent (water) charged in a polymerization tank from the start of polymerization to a certain time. The residual amount after evaporation is the weight of chemical agents and materials that have not volatilized in a condition at 130° C. but have left together with a polymer as solid and are the chemical agents and the materials charged from the start of polymerization to a certain time. The mass of a polymer polymerized before the previous block is also included in the residual amount after evaporation. The monomer charge amount is the total amount of monomers charged in a polymerization tank at the initial step and monomers gradually added from the start of polymerization to a certain time.

<Production of Diblock Copolymer>

Example 1

(Synthesis of Polystyrene Block)

In a 500-ml three-necked separable flask, 50 mg of sodium hydroxide, 1.0 g of sodium naphthalene sulfonate formaldehyde condensate, and 4.43 g of potassium disproportionated tall oil rosin were dissolved in 100 g of water, and the system was degassed by a nitrogen flow on an oil bath at 30° C. for 10 minutes.

Next, 5 g of a styrene monomer (manufactured by Denka Co. Ltd.) from which a stabilizer had been removed through an activated alumina column and 200 mg of benzyl 1-pyrrolecarbodithioate (manufactured by Sigma-Aldrich Japan) were added into the separable flask, and the mixture was emulsified on an oil bath at 30° C. for 10 minutes.

The resulting emulsion was heated to 80° C., and 6.52 g of a 2.00% by weight aqueous solution of 2,2'-azobis[2-(2-imidazolin-2-yl)propane]dihydrochloride (manufactured by Wako Pure Chemical Industries, Ltd.) was added to start polymerization. After 4 hours, the mixture was cooled to 25° C. to stop the polymerization, giving a polystyrene macromonomer latex. Through the above procedure, a polystyrene block (first block) was synthesized.

The polymerization conversion rate of the styrene monomer was calculated from the dry weight of the polystyrene macromonomer latex after air-drying by heat and was determined to be 90% or more. The dried sample thereof was subjected to GPC analysis, and the number average molecular weight (Mn) and the weight average molecular weight (Mw) of the first block were determined.

(Synthesis of Polychloroprene Block)

Next, to the polystyrene macromonomer latex heated at 45° C., 95 g of a chloroprene monomer from which a stabilizer had been removed by distillation was added, and polymerization was performed until the polymerization conversion rate of the chloroprene monomer reached 80%. To the reaction mixture, a 10.0% by weight aqueous solution of N,N-diethylhydroxylamine was added to stop the polymerization reaction, and the mixture was distilled under vacuum to remove the residual chloroprene monomer. Through the above procedure, a polychloroprene block (second block) was synthesized.

The resulting chloroprene styrene diblock copolymer latex was air-dried by heat, and the dry weight was used to calculate the polymerization conversion rate of the chloroprene monomer. The dried sample thereof was subjected to GPC analysis, and the number average molecular weight (Mn) and the weight average molecular weight (Mw) of the second block were determined.

(Drying Up of Chloroprene Styrene Diblock Copolymer)

The resulting chloroprene styrene diblock copolymer latex was adjusted to have a pH of 7.0 and was frozen and solidified on a metal plate cooled at −20° C. to perform demulsification. The resulting sheet was washed with water and dried at 130° C. for 15 minutes, giving a chloroprene styrene diblock copolymer in a solid form of Example 1. The chloroprene styrene diblock copolymer was subjected to GPC analysis, and the number average molecular weight (Mn) and the weight average molecular weight (Mw) of the whole diblock copolymer (first block+second block) were determined.

Example 2

The same procedure as in Example 1 was performed except that the amount of the styrene monomer in Example 1 was changed to 10 g and the amount of the chloroprene monomer was changed to 90 g, giving a chloroprene styrene diblock copolymer of Example 2. The polymerization conversion rate of the styrene monomer was calculated from the dry weight of the polystyrene macromonomer latex after air-drying by heat and was determined to be 90% or more.

Example 31

The same procedure as in Example 1 was performed except that the amount of the styrene monomer in Example 1 was changed to 15 g and the amount of the chloroprene monomer was changed to 85 g, giving a chloroprene styrene diblock copolymer of Example 3. The polymerization conversion rate of the styrene monomer was calculated from the dry weight of the polystyrene macromonomer latex after air-drying by heat and was determined to be 90% or more.

Example 41

The same procedure as in Example 1 was performed except that 200 mg of benzyl 1-pyrrolecarbodithioate in Example 1 was changed to 161 mg of dibenzyl trithiocarbonate, giving a chloroprene styrene diblock copolymer of Example 4. The polymerization conversion rate of the styrene monomer was calculated from the dry weight of the polystyrene macromonomer latex after air-drying by heat and was determined to be 90% or more.

Comparative Example 1

The same procedure as in Example 3 was performed except that the amount of benzyl 1-pyrrolecarbodithioate in Example 3 was changed from 200 mg to 278 mg, giving a chloroprene styrene diblock copolymer of Comparative Example 1 having a number average molecular weight of less than 100,000. The polymerization conversion rate of the styrene monomer was calculated from the dry weight of the polystyrene macromonomer latex after air-drying by heat and was determined to be 90% or more.

Comparative Example 2

The same procedure as in Example 1 was performed except that the amount of the styrene monomer in Example 1 was changed to 50 g and the amount of the chloroprene monomer was changed to 50 g, giving a chloroprene styrene diblock copolymer of Comparative Example 2 in which the chloroprene polymer block had a number average molecular weight of less than 80,000 in total. The polymerization conversion rate of the styrene monomer was calculated from the dry weight of the polystyrene macromonomer latex after air-drying by heat and was determined to be 90% or more.

Examples 1 to 3 and Comparative Examples 1 and 2 are diblock copolymers each having the structure represented by General Formula (a), "A-B—X". Example 4 is a diblock copolymer having the structure represented by General Formula (e), "A-B—X—B-A".

Comparative Example 31

(Synthesis of Chloroprene Homopolymer)

In a 500-ml three-necked separable flask, 50 mg of sodium hydroxide, 1.0 g of sodium naphthalene sulfonate formaldehyde condensate, and 4.43 g of potassium disproportionated tall oil rosin were dissolved in 100 g of water, and the system was degassed by a nitrogen flow on an oil bath at 30° C. for 10 minutes.

Next, 100 g of a chloroprene monomer from which a stabilizer had been removed by vacuum distillation and 1.00 g of diethylxanthogen sulfide were added into the separable flask, and the mixture was emulsified on an oil bath at 30° C. for 10 minutes. The resulting emulsion was heated to 35° C., then a 2.00% by weight aqueous solution of potassium persulfate was added, and polymerization was performed until the polymerization degree reached 60%. A 10.00% by weight aqueous solution of N,N-diethylhydroxylamine was added to stop the reaction, and the mixture was distilled under vacuum to remove the residual chloroprene monomer, giving a chloroprene homopolymer latex.

(Drying Up of Chloroprene Homopolymer)

The resulting chloroprene homopolymer latex was adjusted to have a pH of 7.0 and was frozen and solidified on a metal plate cooled at −20° C. to perform demulsification. The resulting sheet was washed with water and dried at 130° C. for 15 minutes, giving a chloroprene homopolymer in a solid form of Comparative Example 3. The chloroprene homopolymer was subjected to GPC analysis, and the number average molecular weight (Mn) and the weight average molecular weight (Mw) of the chloroprene homopolymer were determined.

Comparative Example 4

(Synthesis of Chloroprene Homopolymer)

In a 500-ml three-necked separable flask, 50 mg of sodium hydroxide, 1.0 g of sodium naphthalene sulfonate formaldehyde condensate, and 4.43 g of potassium disproportionated tall oil rosin were dissolved in 100 g of water, and the system was degassed by a nitrogen flow on an oil bath at 30° C. for 10 minutes.

Next, 100 g of a chloroprene monomer from which a stabilizer had been removed by vacuum distillation and 1.00 g of 1-dodecanethiol were added into the separable flask, and the mixture was emulsified on an oil bath at 30° C. for 10 minutes. The resulting emulsion was heated to 35° C., then a 2.00% by weight aqueous solution of potassium persulfate was added, and polymerization was performed until the polymerization degree reached 65%. A 10.00% by weight aqueous solution of N,N-diethylhydroxylamine was added to stop the reaction, and the mixture was distilled under vacuum to remove the residual chloroprene monomer, giving a chloroprene homopolymer latex. The dried sample thereof was subjected to GPC analysis, and the number average molecular weight (Mn) and the weight average molecular weight (Mw) were determined. As a result, the number average molecular weight (Mn) was $22.3 \times 10^4$ g/mol, the weight average molecular weight (Mw) was $63.4 \times 10^4$ g/mol, and the molecular weight distribution (Mw/Mn) was 2.84.

(Synthesis of Styrene Homopolymer)

In a 500-ml three-necked separable flask, 50 mg of sodium hydroxide, 1.0 g of sodium naphthalene sulfonate formaldehyde condensate, and 4.43 g of potassium disproportionated tall oil rosin were dissolved in 100 g of water, and the system was degassed by a nitrogen flow on an oil bath at 30° C. for 10 minutes.

Next, 10 g of a styrene monomer (manufactured by Denka Co. Ltd.) from which a stabilizer had been removed through an activated alumina column and 200 mg of benzyl 1-pyrrolecarbodithioate (manufactured by Sigma-Aldrich Japan) were added into the separable flask, and the mixture was emulsified on an oil bath at 30° C. for 10 minutes.

The resulting emulsion was heated to 80° C., and 6.52 g of a 2.00% by weight aqueous solution of 2,2'-azobis[2-(2-imidazolin-2-yl)propane]dihydrochloride (manufactured by Wako Pure Chemical Industries, Ltd.) was added to start polymerization. After 4 hours, the mixture was cooled to 25° C. to stop the polymerization, giving a polystyrene macromonomer latex.

The polymerization conversion rate of the styrene monomer was calculated from the dry weight of the polystyrene macromonomer latex after air-drying by heat and was determined to be 90% or more. The dried sample thereof was subjected to GPC analysis to determine the number average molecular weight (Mn) and the weight average molecular weight (Mw). As a result, the number average molecular weight (Mn) was $1.4 \times 10^4$ g/mol, the weight average molecular weight (Mw) was $1.7 \times 10^4$ g/mol, and the molecular weight distribution (Mw/Mn) was 1.24.

(Preparation of Blend of Chloroprene Homopolymer and Styrene Homopolymer)

To 90 parts by mass (in terms of solid content) of the resulting chloroprene homopolymer latex, 10 parts by mass (in terms of solid content) of the styrene homopolymer latex was added, and the whole was stirred and mixed for 60 minutes, giving a blend latex of the chloroprene homopolymer and the styrene homopolymer.

(Drying Up of Blend of Chloroprene Homopolymer and Styrene Homopolymer)

The resulting blend latex of the chloroprene homopolymer and the styrene homopolymer was adjusted to have a pH of 7.0 and was frozen and solidified on a metal plate cooled at −20° C. to perform demulsification. The resulting sheet was washed with water and dried at 130° C. for 15 minutes, giving a blend of the chloroprene homopolymer and the styrene homopolymer in a solid form of Comparative Example 4.

<Production of Rubber>

With 100 parts by mass of each polymer of Examples 1 to 4 and Comparative Examples 1 to 4, 1 part by mass of N-phenyl-1-naphthylamine, 30 parts by mass of carbon black (SRF; Asahi #50 manufactured by Asahi Carbon Co., Ltd.), 4 parts by mass of magnesium oxide (KYOWAMAG #150 manufactured by Kyowa Chemical Industry Co., Ltd.), 5 parts by mass of zinc oxide (manufactured by Sakai Chemical Industry Co., Ltd.), and 0.5 part by mass of ethylene thiourea (ACCEL 22S manufactured by Kawaguchi Chemical Industry Co., Ltd.) were kneaded using an 8-inch roller, giving a rubber composition.

The resulting rubber composition was heated at 160° C. for 20 minutes using an electric heat press, giving a vulcanized rubber.

<Evaluation of Rubber Physical Properties>

The breaking strength and the breaking elongation of the vulcanized rubber were determined in accordance with JIS K6251. A sample having a breaking strength of 20 MPa or more was regarded as acceptance, and a sample having a breaking elongation of 300% or more was regarded as acceptance. The damping performance of the vulcanized rubber was evaluated as hysteresis loss determined in the 25% tensile test in accordance with JIS K6394. A sample having a damping performance of $9.0 \times 10^{0.3}$ J or more was regarded as acceptance.

<Production of Adhesive>

In 100 parts by mass of cyclohexane, 50 parts by mass of an alkylphenol resin (TAMANOL 526: manufactured by Arakawa Chemical Industries, Ltd.) and 3 parts by mass of magnesium oxide (KYOWAMAG #150: manufactured by Kyowa Chemical Industry Co., Ltd.) were dissolved, and were chelated at room temperature for 16 hours.

Next, to the cyclohexane solution, 100 parts by mass of each polymer of Examples 1 to 4 and Comparative Examples 1 to 4, 3 parts by mass of magnesium oxide, 1 part by mass of zinc oxide, 90 parts by mass of cyclohexane, and 190 parts by mass of methyl ethyl ketone were added, and the whole was mixed and stirred until each polymer of Examples 1 to 4 and Comparative Examples 1 to 4 was completely dissolved, giving an adhesive.

<Evaluation of Adhesive>

The high temperature strength of an adhesive at 60° C. was determined by the following procedure. First, an adhesive was applied at 3,000 g/m² onto two pieces of canvas (25 mm×150 mm). Then, the open time was set at 30 minutes, and a hand roller was reciprocated 5 times. Next, the adherend after a set time of 10 days was peeled at a condition of 50 mm/min using a tensile tester with a constant temperature chamber at 60° C. to determine the peel strength. As for the high temperature strength, a sample having a peel strength of 1.0 N/mm or more was regarded as acceptance.

The solution viscosity of an adhesive was determined at 25° C. using a Brookfield viscometer. As for the solution viscosity, a sample having a viscosity of 150 mPa·s or less was regarded as acceptance.

The results of Examples 1 to 4 and Comparative Examples 1 to 4 are shown in Table 1. In Table 1, "PS" means polystyrene, "PCP" means polychloroprene, "CP/St" means a blend of a homopolychloroprene latex and a homopolystyrene latex.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| | End structure | | pyrrole-N-C(=S)-S- | pyrrole-N-C(=S)-S- | pyrrole-N-C(=S)-S- | -S-C(=S)-S- | pyrrole-N-C(=S)-S- | pyrrole-N-C(=S)-S- | EtO-C(=S)-S- | $C_{12}H_{25}S-$ |
| First block | Polymer type | | PS | PS | PS | PS | PS | PS | PCP | CP/St |
| | Mn | $10^3$ g/mol | 5.5 | 14.1 | 19.0 | 9.5 | 15.4 | 63.2 | 20.6 | |
| | Mw/Mn | $10^3$ g/mol | 1.24 | 1.26 | 1.24 | 1.29 | 1.13 | 1.26 | 2.51 | |
| First block + second block | Polymer type | | PS + PCP | PS + PCP | PS + PCP | PS + PCP | PS + PCP | PS + PCP | | |
| | Mn | $10^3$ g/mol | 143.8 | 129.9 | 134.8 | 121.7 | 97.5 | 132.8 | | |
| | Mw/Mn | $10^3$ g/mol | 1.67 | 1.64 | 1.67 | 3.01 | 1.54 | 1.69 | | |
| Second block alone | Mn | $10^3$ g/mol | 138.3 | 115.8 | 115.8 | 112.2 | 82.1 | 69.6 | | |
| Rubber physical properties | Breaking strength | MPa | 24.5 | 24.6 | 25.6 | 24.9 | 18.7 | 14.8 | 20.5 | 19.5 |
| | Breaking elongation | % | 452 | 398 | 365 | 404 | 351 | 130 | 390 | 386 |
| | Hardness | Shore A | 72 | 69 | 70 | 70 | 68 | 89 | 71 | 71 |
| | Damping performance | $10^{-3}$ J | 9.1 | 20.1 | 33.8 | 21.1 | 29.4 | 87.4 | 7.3 | 20.0 |
| Adhesive physical properties | High temperature strength at 60° C. | N/mm | 1.06 | 2.77 | 3.94 | 2.69 | 0.79 | No adhesion | 1.52 | 1.48 |
| | Solution viscocity | mPa·s | 68 | 104 | 84 | 99 | 64 | 98 | 353 | 339 |

As shown in Table 1, each rubber comprising the diblock copolymers of Examples 1 to 4 had an excellent breaking strength, breaking elongation, and damping performance. Each adhesive comprising the diblock copolymers of Examples 1 to 4 had a low viscosity and an excellent high temperature strength.

In contrast, the rubber comprising the polymer of Comparative Example 1, 2, or 4 had substantially the same hardness as in Examples but had a lower breaking strength. The adhesive comprising the diblock copolymer of Comparative Example 1 had a poor high temperature strength. The adhesive comprising the diblock copolymer of Comparative Example 2 had no heat resistance. The adhesive comprising the polymer of Comparative Example 3 or 4 had an excessively high solution viscosity and had poor coating properties.

<Production of Triblock Copolymer>

Example 5

(Synthesis of Polystyrene Block)

In a 500-ml three-necked separable flask, 50 mg of sodium hydroxide, 1.0 g of sodium naphthalene sulfonate formaldehyde condensate, and 4.43 g of potassium disproportionated tall oil rosin were dissolved in 100 g of water, and the system was degassed by a nitrogen flow on an oil bath at 30° C. for 10 minutes.

Next, 5 g of a styrene monomer (manufactured by Denka Co. Ltd.) from which a stabilizer had been removed through an activated alumina column and 200 mg of benzyl 1-pyrrolecarbodithioate (manufactured by Sigma-Aldrich Japan) were added in the separable flask, and the mixture was emulsified on an oil bath at 30° C. for 10 minutes.

The resulting emulsion was heated to 80° C., and 6.52 g of a 2.00% by weight aqueous solution of 2,2'-azobis[2-(2-imidazolin-2-yl)propane]dihydrochloride (manufactured by Wako Pure Chemical Industries, Ltd.) was added to start polymerization. After 4 hours, the mixture was cooled to 25° C. to stop the polymerization, giving a polystyrene macromonomer latex. Through the above procedure, a polystyrene block (first block) was synthesized.

The polymerization conversion rate of the styrene monomer was calculated from the dry weight of the polystyrene macromonomer latex after air-drying by heat and was determined to be 90% or more. The dried sample thereof was subjected to GPC analysis, and the number average molecular weight (Mn) and the weight average molecular weight (Mw) of the first block were determined.

(Synthesis of Polychloroprene Block)

Next, to the polystyrene macromonomer latex heated at 45° C., 90 g of a chloroprene monomer from which a stabilizer had been removed by distillation was added, and polymerization was performed until the polymerization conversion rate of the chloroprene monomer reached 800/%. To the reaction mixture, a 10.0% by weight aqueous solution of N,N-diethylhydroxylamine was added to stop the polymerization reaction, and the mixture was distilled under vacuum to remove the residual chloroprene monomer. Through the above procedure, a polychloroprene block (second block) was synthesized.

The chloroprene styrene diblock copolymer latex was air-dried by heat, and the dry weight was used to calculate the polymerization conversion rate of the chloroprene monomer. The dried sample thereof was subjected to GPC analysis, and the number average molecular weight (Mn) and the weight average molecular weight (Mw) of the second block were determined.

(Synthesis of Polystyrene Block)

Next, to the chloroprene styrene diblock copolymer latex, 5 g of a styrene monomer (manufactured by Denka Co. Ltd.) from which a stabilizer had been removed through an activated alumina column was added. The whole was stirred at normal temperature for 20 minutes and then was heated to 80° C. To the mixture, 6.52 g of a 2.00% by weight aqueous solution of 2,2'-azobis[2-(2-imidazolin-2-yl)propane] dihydrochloride (manufactured by Wako Pure Chemical Industries, Ltd.) was added to promote polymerization, and then the mixture was cooled to 25° C. to stop the polymerization. Through the above procedure, a polystyrene block (third block) was synthesized.

The styrene chloroprene styrene triblock copolymer latex was air-dried by heat, and the polymerization conversion rate of the styrene monomer was calculated from the dry weight to be 90% or more. The dried sample thereof was subjected to GPC analysis, and the number average molecular weight (Mn) and the weight average molecular weight (Mw) of the third block were determined.

(Drying Up of Styrene Chloroprene Styrene Triblock Copolymer)

The resulting styrene chloroprene styrene triblock copolymer latex was adjusted to have a pH of 7.0 and was frozen and solidified on a metal plate cooled at −20° C. to perform demulsification. The resulting sheet was washed with water and dried at 130° C. for 15 minutes, giving a styrene chloroprene styrene triblock copolymer in a solid form of Example 5. The styrene chloroprene styrene triblock copolymer was subjected to GPC analysis, and the number average molecular weight (Mn) and the weight average molecular weight (Mw) of the whole triblock copolymer (first block+second block+third block) were determined.

Example 5 is a triblock copolymer having the structure represented by General Formula (c), "A-B-A-X".

The resulting triblock copolymer of Example 5 was used to produce a rubber and an adhesive by the same procedure as above, and the products were evaluated. The results of Example 5 are shown in Table 2.

As shown in Table 2, the rubber comprising the triblock copolymer of Example 5 had an excellent breaking strength, breaking elongation, and damping performance. The adhesive comprising the triblock copolymer of Example 5 had a low viscosity and an excellent high temperature strength.

The invention claimed is:

1. A block copolymer comprising:
   at least one aromatic vinyl compound polymer block; and
   at least one chloroprene polymer block,
   wherein the block copolymer has a functional group with a structure represented by Chemical Formula (2) and having a number average molecular weight of 100,000 or more,
   the chloroprene polymer block has a number average molecular weight of 80,000 or more in total, and a polymerization conversion ratio of a monomer of the aromatic vinyl compound polymer block in the block copolymer is 90% or more:

[Chemical Formula 2]

$$\text{\Large{$\sim$}}\!S\!-\!\underset{\|}{C}(\!=\!S)\!-\!S\!\text{\Large{$\sim$}} \tag{2}$$

2. The block copolymer according to claim 1, wherein the aromatic vinyl compound is at least one selected from the group consisting of styrene, alkylstyrenes, arylstyrenes, halogenated styrenes, alkoxystyrenes, and vinylbenzoic acid esters.

3. A composition comprising the block copolymer according to claim 1.

4. The composition according to claim 3 being a rubber composition or an adhesive composition.

5. A base isolation/vibration isolation part, a belt, an adhesive, an automobile part, a motorcycle part, an aircraft

TABLE 2

|  |  |  | Example 5  |
|---|---|---|---|
|  | End structure |  |  |
| First block | Polymer type |  | PS |
|  | Mn | $10^3$ g/mol | 7.5 |
|  | Mw/Mn | $10^3$ g/mol | 1.19 |
| First block + second block | Polymer type |  | PS + PCP |
|  | Mn | $10^3$ g/mol | 151.2 |
|  | Mw/Mn | $10^3$ g/mol | 2.22 |
| Second block alone | Mn |  | 143.70 |
| First block + second block + third block | Polymer type |  | PS + PCP + PS |
|  | Mn | $10^3$ g/mol | 159.2 |
|  | Mw/Mn | $10^3$ g/mol | 2.35 |
| Third block alone | Mn |  | 8.00 |
| Rubber physical properties | Breaking strength | MPa | 27.9 |
|  | Breaking elongation | % | 455 |
|  | Hardness | Shore A | 72 |
|  | Damping performance | $10^{-3}$ J | 19.2 |
| Adhesive physical properties | High temperature strength at 60° C. | N/mm | 2.85 |
|  | Solution viscocity | mPa · s | 112 | part, a ship part, a railway car part, a medical care/nursing care part, or an electronic material comprising the composition according to claim 3.

6. The block copolymer according to claim 1, wherein a molecular weight distribution (Mw/Mn) is 1.6 or more and 3.0 or less.

7. The block copolymer according to claim 1, further comprising a radical polymerization initiator in an amount from 0.001 to 5 parts by mass relative to 100 parts by mass of the monomer of the aromatic vinyl compound polymer block.

8. A method for producing a block copolymer, the method comprising:
subjecting monomers of an aromatic vinyl compound alone or an aromatic vinyl compound monomers together with an additional monomer to living radical emulsion polymerization in a presence of a compound represented by Chemical Formula (3) or (4), synthesizing an aromatic vinyl compound polymer block; and then
adding chloroprene monomers alone or chloroprene monomers together with an additional monomer to promote living radical emulsion polymerization, synthesizing a chloroprene polymer block, wherein
the block copolymer has a number average molecular weight of 100,000 or more, and
the chloroprene polymer block has a number average molecular weight of 80,000 or more in total, and a polymerization conversion ratio of the monomers of the aromatic vinyl compound polymer block in the block copolymer is 90% or more:

[Chemical Formula 3]

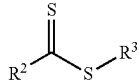
(3)

[Chemical Formula 4]

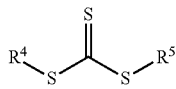
(4)

(in Chemical Formula (3), $R^2$ is hydrogen, chlorine, a substituted or unsubstituted alkyl group, a substituted or unsubstituted alkenyl group, a substituted or unsubstituted aryl group, or a substituted or unsubstituted heterocyclyl group; and in Chemical Formulae (3) and (4), $R^3$ to $R^5$ are each independently a substituted or unsubstituted alkyl group, a substituted or unsubstituted, saturated, unsaturated, or aromatic carbocycle, a substituted or unsubstituted, saturated, unsaturated, or aromatic heterocycle, an organometallic species, or any polymer chain).

9. A method for producing a block copolymer, the method comprising:
gradually adding chloroprene monomers alone or chloroprene monomers together with an additional monomer in a presence of a compound represented by Chemical Formula (3) or (4) to promote living radical emulsion polymerization, synthesizing a chloroprene polymer block; and then
adding an aromatic vinyl compound monomers alone or an aromatic vinyl compound monomers together with an additional monomer to promote living radical emulsion polymerization, synthesizing an aromatic vinyl compound polymer block, wherein
the block copolymer has a number average molecular weight of 100,000 or more, and
the chloroprene polymer block has a number average molecular weight of 80,000 or more in total, and a polymerization conversion ratio of the monomers of the aromatic vinyl compound polymer block in the block copolymer is 90% or more:

[Chemical Formula 3]

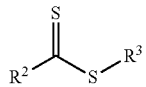
(3)

[Chemical Formula 4]

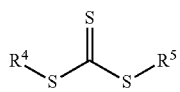
(4)

(in Chemical Formula (3), $R^2$ is hydrogen, chlorine, a substituted or unsubstituted alkyl group, a substituted or unsubstituted alkenyl group, a substituted or unsubstituted aryl group, or a substituted or unsubstituted heterocyclyl group; and in Chemical Formulae (3) and (4), $R^3$ to $R^5$ are each independently a substituted or unsubstituted alkyl group, a substituted or unsubstituted, saturated, unsaturated, or aromatic carbocycle, a substituted or unsubstituted, saturated, unsaturated, or aromatic heterocycle, an organometallic species, or any polymer chain).

* * * * *